United States Patent [19]

Hendrickson

[11] Patent Number: 5,366,263
[45] Date of Patent: Nov. 22, 1994

[54] RELEASABLE FASTENER FOR PIPE COUPLINGS

[75] Inventor: Thomas R. Hendrickson, Pelkie, Mich.

[73] Assignee: Quikcoup, Inc., Houghton, Mich.

[21] Appl. No.: 142,169

[22] Filed: Oct. 22, 1993

[51] Int. Cl.⁵ .............................................. F16L 23/08
[52] U.S. Cl. ...................... 285/364; 285/365; 285/406; 285/409; 24/270; 24/273
[58] Field of Search .............. 285/364, 406, 112, 365, 285/407, 409; 24/270 X, 273 X

[56] References Cited

U.S. PATENT DOCUMENTS

| 815,558 | 3/1906 | Rooier | 24/270 |
| 892,197 | 6/1908 | Umpleby et al. | 24/273 |
| 3,476,410 | 11/1969 | Pastua, Jr. | 255/112 |

FOREIGN PATENT DOCUMENTS

| 552347 | 1/1958 | Canada | 24/273 |
| 540116 | 12/1931 | Germany | 285/364 |
| 405838 | 7/1966 | Switzerland | 285/365 |
| 835005 | 5/1960 | United Kingdom | 24/270 |

Primary Examiner—Randolph A. Reese
Assistant Examiner—Heather Chun Shackelford
Attorney, Agent, or Firm—Harness, Dickey & Pierce

[57] ABSTRACT

A manually releasable, toggle-type fastener is provided for use, in place of the conventional bolt and nut fastener, used to secure together the adjacent bolt lugs formed on the ends of curved segments which form a circular pipe coupling. The fastener includes a pin of a shape and size to fit into the aligned bolt holes of the lugs, in place of a conventional bolt, and a lever pivotally connected to one end of the pin for swinging into a locked position adjacent its segment and into an unlocked position away from its segment. The lever has a hook-like formation on its end to which a wire-like loop is secured. The loop extends around the sides of the pin and the sides of the bolt lugs to be fastened together and has an opposite end engaging both the pin and the adjacent surface of the segment for securing the lugs together and for being restrained from release by the pin itself. The fastener may be made in different sizes to fit different size bolt lugs on different size couplings and the loop may be exchanged with different size loops for utilizing the same fastener, but with different size loops for different size coupling lugs.

6 Claims, 3 Drawing Sheets

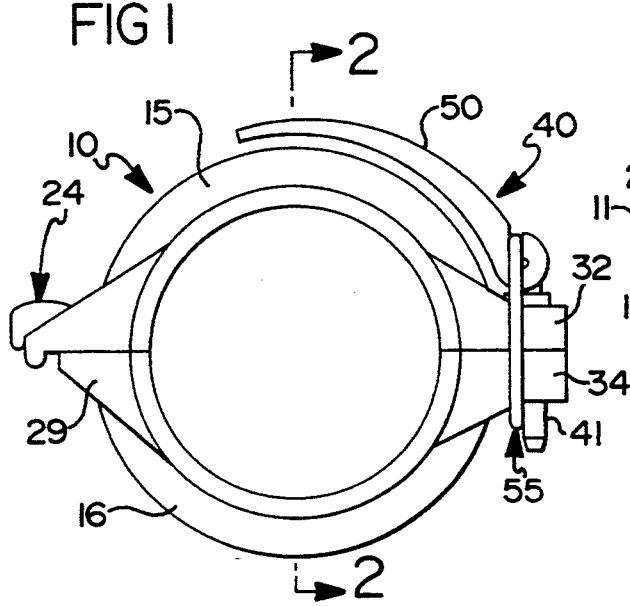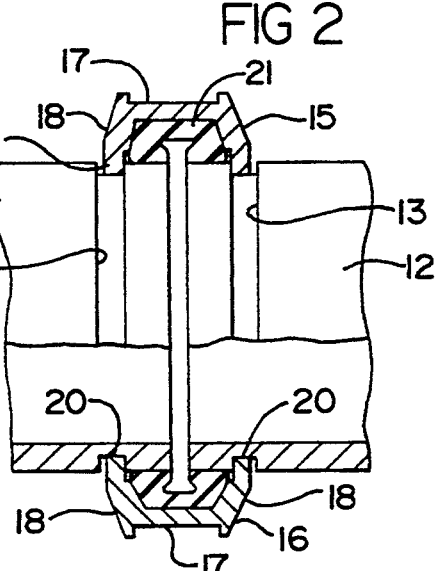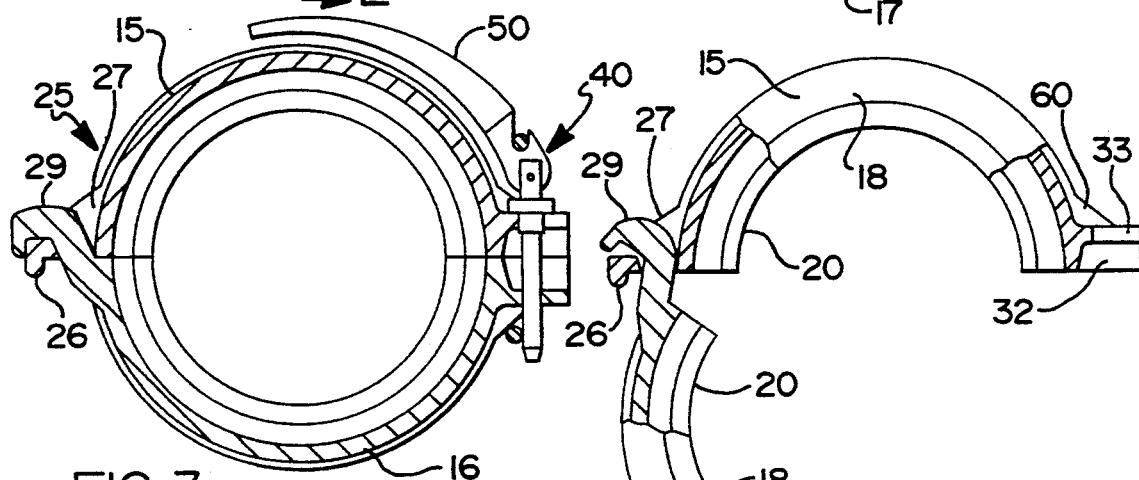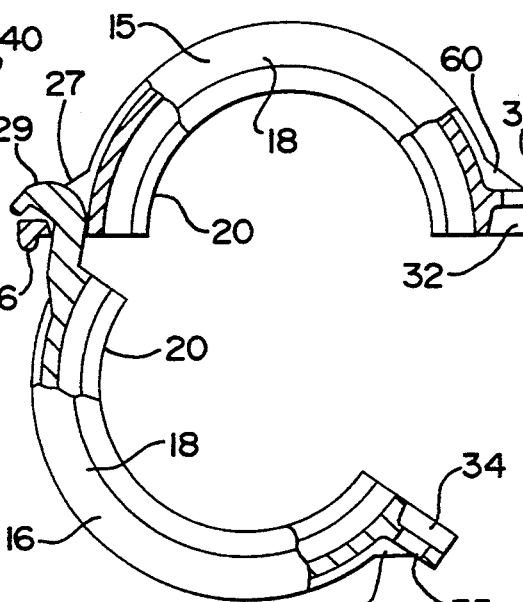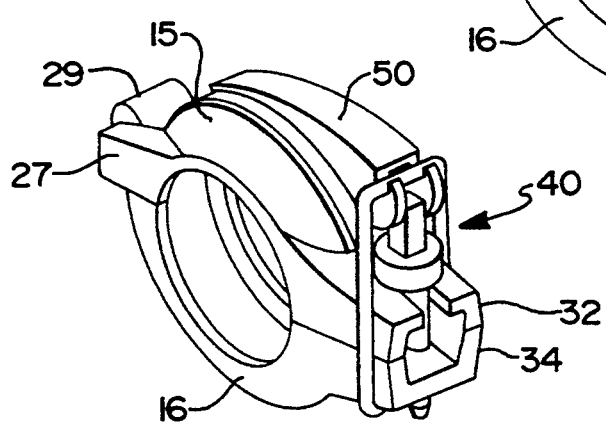

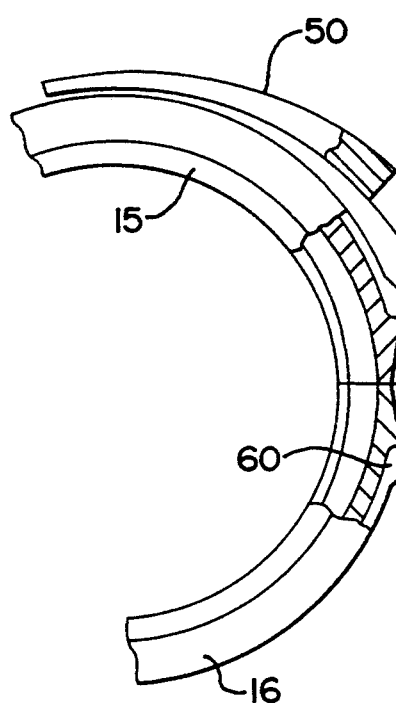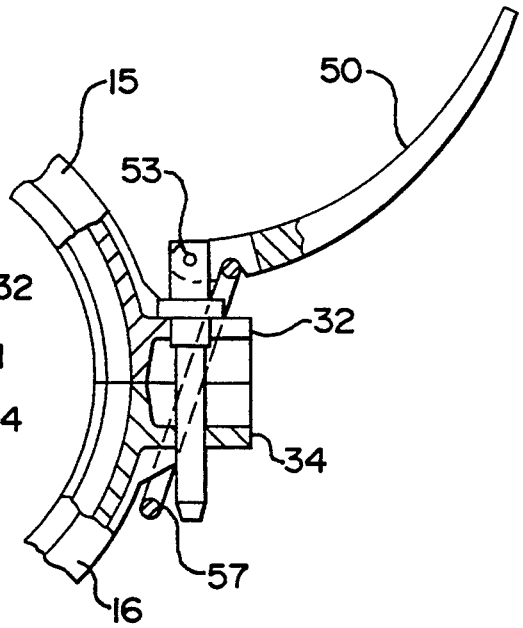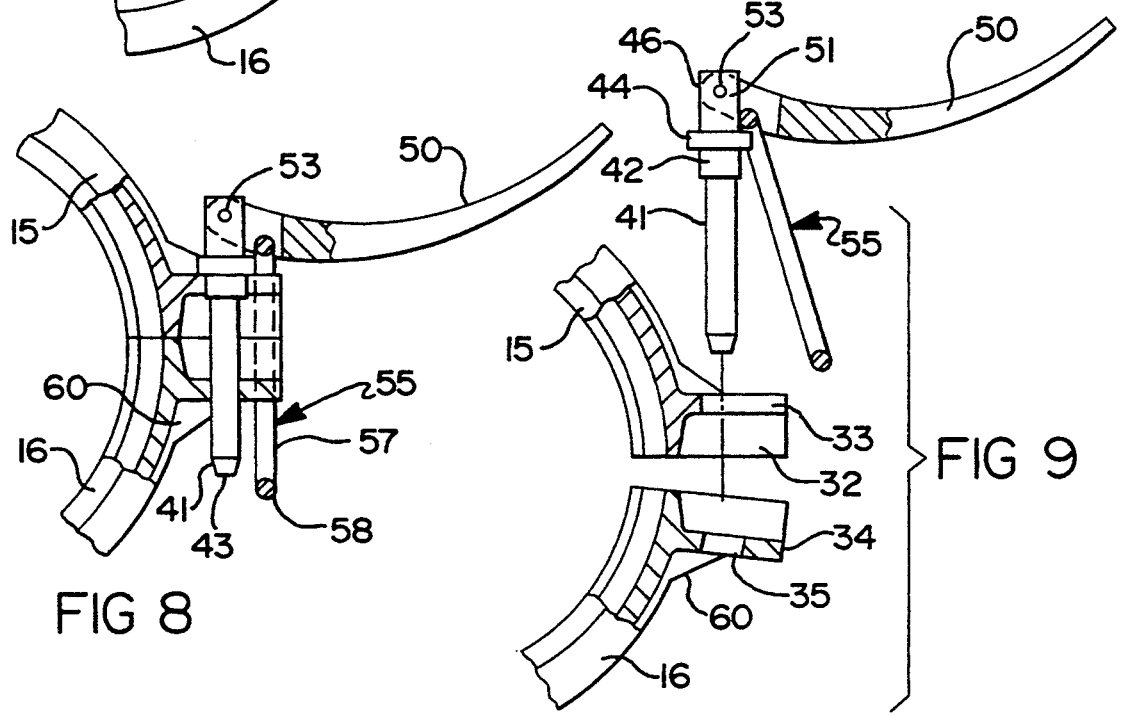

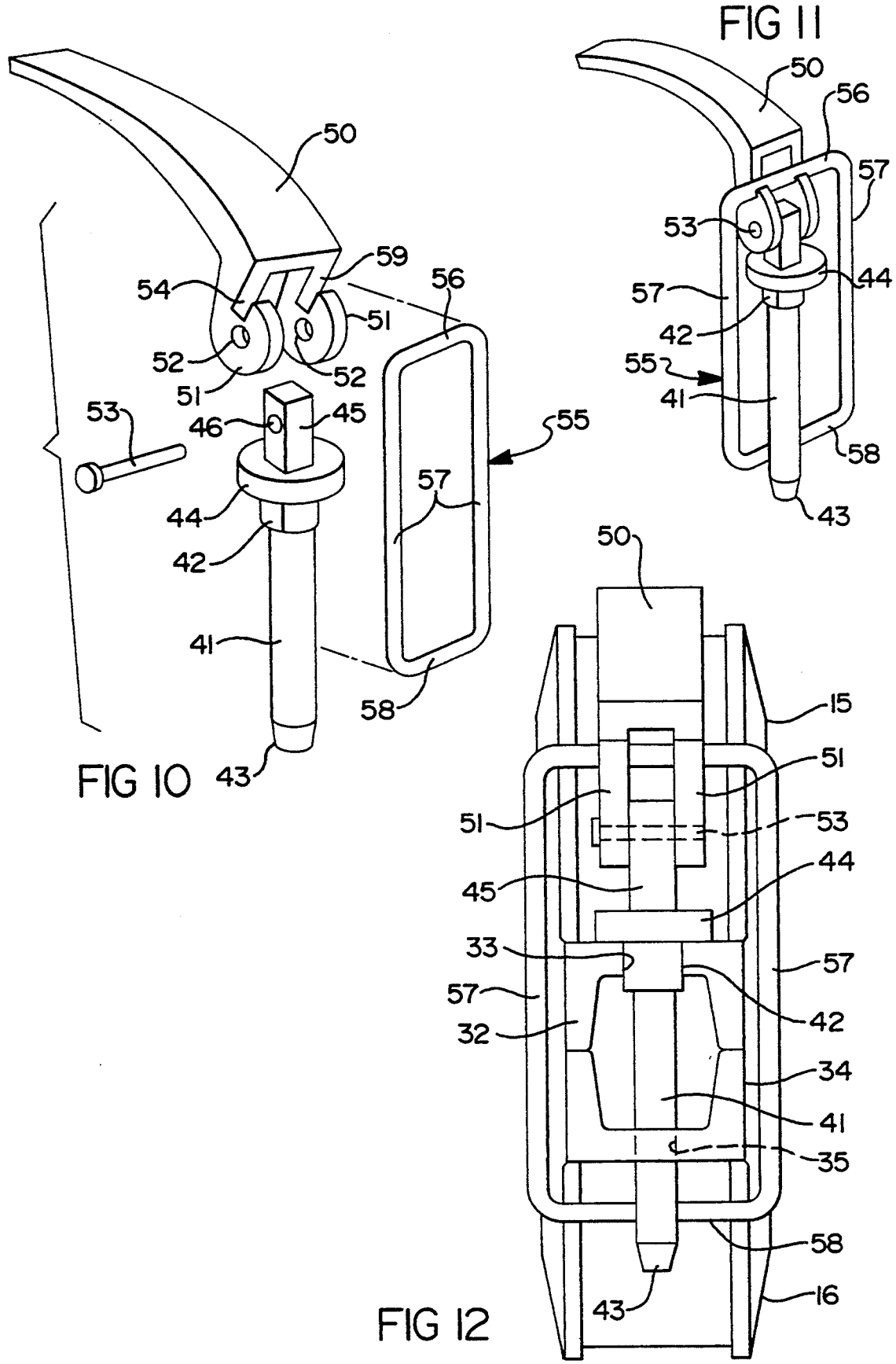

RELEASABLE FASTENER FOR PIPE COUPLINGS

BACKGROUND OF INVENTION

This invention relates to a manually releasable fastener which may be substituted for conventional bolt and nut fasteners that are used for securing together the adjacent ends of conventional segment type pipe couplings.

A conventional type of pipe coupling comprises two or more curved segments which are assembled together end to end to encircle and couple the adjacent ends of a pair of aligned pipes. Typically, such couplings are provided with integral, radially outwardly extending lugs on the ends of the curved segments. These lugs are provided with bolt holes through which bolts are extended and fastened by nuts for securing the segments together to form the circular or ring-like coupling. In such couplings, both ends of each segment may be formed with bolt receiving lugs. Adjacent lugs are secured together with conventional bolts and nuts. Optionally, some of the segments may be provided with hinge components for hingedly connecting that segment to the end of its adjacent segment. These bolts and nuts may be used to fasten the lugs on the opposite sides of segments. Examples of such couplings are described and illustrated in U.S. Pat. No. 4,915,418 to Josef Palatchy on Apr. 10, 1990 for a "Hinged Pipe Coupling", U.S. Pat. No. 4,966,395 issued to Thomas R. Hendrickson on Oct. 30, 1990 for a "Rigid or Flexible Coupling for Pipes", and U.S. Pat. No. 5,018,768 issued to Josef Palatchy on May 28, 1992 for a "Pipe Coupling Hinge".

Such pipe couplings generally comprise curved segments that are U-shaped in cross-section with side walls or legs that extend radially inwardly from a band-like base. The inner free edges of the legs form keys or tenons which fit into grooves cut in the pipes, near the ends of the pipes.

A rubber-like gasket is arranged within the space or channel formed by U-shaped coupling segments. The gasket encircles and seals the adjacent ends of the pipes when the keys are placed within the pipe grooves. Such couplings are typically used for water lines or pipe lines for conducting other fluid or gases. By way of example, water lines may be formed of a number of pipe sections coupled end to end. Each pipe section is provided with grooves near its ends and the pairs of pipe ends are arranged closely adjacent to each other. The coupling is then positioned around a pair of adjacent pipe ends and is secured in place to form a coupled joint.

Whether the segments are fastened together at one end by a hinge arrangement and at the opposite end by bolt and nut fasteners or whether the segments are fastened together entirely by bolt and nut fasteners, the segments must be manually positioned around the pipe ends. Then considerable time is involved in manipulating and fastening the bolt and nut fasteners. Although the time is not great for any one bolt and nut fastener, in the aggregate where numerous couplings are used, as for example, in a water line in a building, a considerable amount of time is required on the part of the plumbing installer. Hence, it is desirable to have a coupling system in which the segments of a coupling can be manually assembled rapidly, without the need of wrenches or other tools. To meet that need, prior couplings that are commercially available are provided with toggle or lever types of fasteners for interlocking adjacent ends of coupling segments. Examples of such devices are shown in U.S. Pat. No. 4,123,095 issued to Theodore A. Stehlin on Oct. 31, 1978 for a "Pipe Clamp Having An Overcenter Toggle", U.S. Pat. No. 4,561,678 issued to Donald R. Kunsman on Dec. 31, 1985 for a "Pipe Coupling" and Swiss Pat. No. 390,637 granted to Societe de Constructions d'Appareils Mecaniques Inoxydables on Apr. 15, 1965.

Segmented pipe couplings that use bolt fasteners are relatively inexpensive to manufacture. In contrast, pipe couplings that use toggle fasteners, particularly where made with sufficient strength and rigidity for coupling relatively large pipes, are considerably more expensive to produce. Thus, it would be desirable to have available, on a plumbing contracting job site, relatively inexpensive bolt-type fastened couplings with the toggle-type fasteners and without the required expense for a toggle type coupling.

The invention herein relates to a fastener, similar to a toggle-type locking fastener, which may be manufactured and stored as an independent unit, and which may be substituted for the typical bolt and nut fastener in a conventional bolt type coupling so as to provide the low cost benefit of the bolt-type coupling with the high speed, manual assembly ability of the toggle-type coupling.

SUMMARY OF INVENTION

This invention contemplates a releasable fastener which is formed of a pin member of a size and shape to be used in place of a conventional bolt fastener in the fastener lugs formed on the ends of pipe coupling segments. The pin, like a bolt, is provided with a head that engages the exterior surface of a lug through which the pin is inserted. The head is provided with an extension which is fastened, by a pivotal connection, to the end of a toggle-type lever. The lever has a hook-like forward portion which receives and is engaged with an elongated, roughly rectangular shaped wire loop whose sides extend along the sides of the pin. The lower end of the loop may be engaged against the lower surface of the bolt lug or adjacent segment surface so that the loop, when the toggle lever is swung into locking position, engages and fastens the two adjacent bolt lugs together. Preferably, the loop is of a size and shape to fit between a section of the pin that extends beneath the bolt lugs so that the loop is restrained by the pin in its lug engaging and locking position.

The fastener construction is simple and inexpensive to produce. It may be formed as a separate unit which is available to plumbing contractors to use, when desired, in place of the bolt and nut fasteners which otherwise would be used with couplings of the type described. Thus, it is contemplated to form such fasteners in several different sizes, each size of which can accommodate a number of different size couplings so that the number of fasteners may be limited, as for example, to three different sizes, to accommodate a wide range of couplings, as for example, nine different sizes. Thus, the plumbing installer has the option of either using the removable fastener of this invention when desired and, particularly, in places where it is desirable to provide a quick connection and disconnection. An example of this would occur where a water line is arranged in an agricultural environment for delivering water from one place in a field to another and then the line must be disassembled and reassembled in another location. Although the fasteners herein are much more expensive than bolts and nuts, the speed of application and removal is so much greater that a water line can be laid in place and removed and replaced elsewhere so quickly that the additional expense of the fastener is made up by the substantial reduction in labor costs.

A similar utility for the fastener herein could be in mines where water pipes or pipes carrying other liquids or gases must be installed and then removed and replaced periodically. Again, the increase in expense for the fasteners, which are used in place of the less expensive bolt and nut fasteners, is off-set by the substantial reduction in labor. Other environments and uses of the fastener herein will be apparent to those involved in installing and removing piping of various kinds.

One object of this invention is to provide a fastener which can be readily used in place of the bolt and nut fasteners that are normally used with segment type couplings. The construction of the improved fastener herein is such that it is relatively inexpensive, relatively lightweight and small in size so that it can be easily carried to, and made available at job sites by contractors, and can be readily applied and removed manually without the use of any tools.

Another object of this invention is to provide a fastener which can be used with typical, readily available and conventional couplings of various sizes whenever an installer chooses to use such a fastener in place of the commonly used bolt and nut fasteners. This arrangement would substantially reduce the cost of using a toggle-type of coupling since the costs of the fastener herein plus a conventional bolt type coupling would be less than the cost of a typical toggle-type coupling.

These and other objects and advantages of this invention will become apparent upon reading the following description, of which the attached drawings form a part. Referring now to the drawings:

DESCRIPTION OF DRAWING

FIG. 1 is an elevational view of a pipe coupling comprising a pair of curved segments which are connected together by a hinge connection at one end and by the fastener securing together the segment bolt lugs at the opposite ends of the segments;

FIG. 2 is a cross-sectional view taken in the direction of arrows 2—2 of the coupling only to illustrate schematically the engagement between the coupling keys or tenons with the grooves formed in the ends of pipes;

FIG. 3 is a cross-sectional, elevational view of the coupling illustrated in FIG. 1 and illustrates the positioning of the fastener in the bolt lugs;

FIG. 4 is a view, partially in cross-section showing the segments, with the fastener removed, swung apart about their adjacent hinge elements, for engagement or disengagement of pipe ends;

FIG. 5 is a perspective view showing the bolt lugs of the coupling fastened together by the fastener of this invention;

FIG. 6 is an enlarged, fragmentary view, partially in cross-section showing the fastener in operative or fastened position within the bolt lugs of a coupling;

FIG. 7 illustrates the lever or toggle handle of the fastener swung into a release position which releases the gripping action of the fastener loop around the bolt lugs;

FIG. 8 is a fragmentary view, partially in cross-section, similar to FIG. 7, showing the toggle handle swung into its fastener release position with the loop cleared of the pin for removal of the pin from the bolt lugs;

FIG. 9 is a fragmentary, partially cross-section view, showing the fastener located in a position for either installing the fastener within the bolt lugs or removing the fastener from the bolt lugs;

FIG. 10 is a perspective view of the fastener with the parts disassembled;

FIG. 11 is a perspective view of the fastener showing the parts in an assembled arrangement; and FIG. 12 is an enlarged, end view of the fastener in place for locking together the adjacent bolt lugs of the coupling segments.

DETAIL DESCRIPTION

Referring to the drawings, FIG. 1 illustrates an hinge-segment type of pipe coupling 10 which is used to couple the adjacent ends of aligned pipes 11 and 12 as shown in FIG. 2. The pipes are provided with grooves 13 near their ends.

The pipe coupling is formed, in this illustration, of an upper, semi-circular curved segment 15 and a lower, semi-circular curved segment 16 which are arranged in end to end alignment to form a circular coupling that surrounds the pipe ends. Each of the segments are U-shaped in cross-section to provide an exterior base 17 with radially inwardly directed sidewalls 18. The free edges of the sidewalls form keys or tenons 19 which fit into the grooves 13 in the pipes. (See FIG. 2). A rubber-like gasket 21 is arranged within the space provided by the U-shaped configuration of the segments. The gasket surrounds the pipes and is sealed to the surfaces of the pipes. Such gaskets are conventional and comes in various shapes and sizes.

The adjacent ends of the aligned coupling segments may be fastened together by bolts and nuts as is conventional or, in another form of such couplings, may have one pair of adjacent ends fastened together by means of a hinge formation and the opposite ends fastened together by a bolt and nut. The coupling illustrated in the drawings is provided with a hinge fastening arrangements as illustrated. Thus, the segments 15 and 16 may be provided with a hinge connection 24 which comprises a U-shaped lug 25 formed integrally on the upper segment 15. The lug provides an axial 26 arranged transversely of the coupling base, that is, parallel to the axis of the coupling. The axial is integral with shaped apart sidewalls 27 which, in turn, are integral with the segment body. The lower segment 16 is formed with an integral hook-shaped lug 29 which fits into the shape between the axial 26 and the sidewalls 27 and engages around the axial for hinging operation. This is illustrated in FIGS. 3 and 4. The particular shape and arrangement of the hinge connection is not material to the invention of this application.

Normally, the coupling illustrated in the drawings would be arranged with their segments pivoted or hinged apart, as shown in FIG. 4, to fit around a pair of aligned pipe ends. The installer typically would arrange the pipe ends in alignment and arrange the gasket 21 around the adjacent ends. Then, he would hinge the two segments towards each other, to form the circular coupling surrounding the pipe ends and positioning the keys or tenons of the segments in the pipe grooves 13. Next, the application of a bolt and nut would be used to fasten the opposite ends of the segments together.

In order to fasten the segment ends together, the upper segment 15 is provided with an integral, radially outwardly extending bolt lug 32 which, for example, may be U-shaped in cross-section. The base of the U-shaped lug is provided with a generally radially extending slot 33 for receiving a bolt. The lower curve segment 16 is provided with an integral, U-shaped in cross-section, bolt lug 34 which may be provided with a bolt hole 35 through which the bolt may extend. The foregoing arrangement is known.

Rather than utilizing a conventional bolt extending through the slot 33 and bolt hole 35 in the bolt lugs 32 and 34, the piping installer may use the fastener, generally designated as 40, the construction of the fastener is illustrated in FIGS. 10 and 11.

The fastener comprises an elongated pin 41 which is approximately of the same diameter and roughly the same length, or perhaps slightly longer, than a typical bolt which would have otherwise been used with the illustrated coupling. The upper end of the pin is slightly enlarged to provide a flat surface 42 on opposite sides for snug engagement against the walls defining the slot 33 in the upper bolt lug. The lower end 43 of the pin is preferable tapered to guide the pin as it is inserted through the slot and bolt hole.

The pin is provided with a head 44 of suitable size and shape to engage against the exposed surface of the upper lug. In addition, the head is provided with an integral head extension 45 which extends upperwardly from the head. A hole 46, to receive a pivot pin, is formed in the head extension.

The fastener includes a toggle type handle or lever 50. A pair of hook-like end portions 51 are formed on the lever and are spaced apart a sufficient distance to receive the head extension 45 of the pin. Pivot pin holes 52 are formed in the end portions for receiving a pivot pin 53 which pivotally connects the lever to the head extension.

A rigid, wire-like loop 55, which is roughly rectangular in shape, is provided with an upper portion 56 that is engaged with the lever. The loop has side parts 57 which extend downwardly on opposite sides of the pin, and includes a lower part 58 for engagement with the lower surface of the lower-most lug. The upper part of the loop fits tightly into the hook forming slots 59 in the hook end portions 51 of the lever, as illustrated in FIG. 11.

In operation, when the piping installer decides to use the fastener 40, in place of the usual bolt and nut, he follows the same procedure for applying the coupling around the pipe ends, as he would have used for the bolt and nut fastener. However, to fasten the adjacent bolt lugs together, the installer positions the pin 41 within the slot 33 of the upper bolt lug 32 and the bolt hole 35 of the lower bolt lug 34. The lever handle would be in the position generally shown in FIG. 9 with the loop dangling downwardly, adjacent the pin. Next, the loop is swung around the pin so that it is between the pin and the adjacent surface of the segment and its lug, at which point the lever is swung manually into the position shown, for example, in Figs. I and 3, to pull the wire loop lower part into tight engagement with the lower segment for locking the bolt lugs together.

FIGS. 6–9 show the sequence of removing the fastener which, of course, could be reversed for installing the fastener. Thus, FIG. 6 shows the pin arranged within the aligned bolt lugs and the toggle-handle or lever in a locked position. As can be seen, the lower portion of the loop is snugly and tightly fitted in the space between the lower part of the pin and the segment surface adjacent the pin. Next, the toggle lever is manually swung into the position shown in FIG. 7 to loosen or release the wire loop which is illustrated as still having its lower portion arranged between the pin and the segment.

Further movement of the toggle lever, shown in FIG. 8, permits the lower part 58 of the loop to swing clear of and forwardly of the pin. At that point, the fastener may be manually pulled upwardly to pull the pin out of the aligned lugs and, thereby, release the coupling from the pipes.

The shape and sizes of the lugs may be varied. For example, the lugs may be solid rather than U-shaped in cross-section. Also, different size loops, that is, different size widths and heights of the loops may be used to fit different size lugs which would be found on different size couplings. In that situation, a pin may be used for a wide variety of lugs by utilizing a pin whose diameter and length is similar to the bolts otherwise used on a particular line of couplings of different sizes. That is, by simply changing loops, for use with different size lugs, the remaining construction of the fastener may be used on a wide variety of couplings of different sizes.

This invention may be further developed within the scope of the following claims. Accordingly, it is desired that the foregoing description be read as being merely illustrative of an operative embodiment of this invention and not in a strictly limited sense. Having fully described one operative embodiment of this invention, I know claim:

I claim:

1. A releasable fastener for use in place of a fastener bolt which is normally used in a pipe coupling having curved segments which are arranged end to end around a central axis to encircle the adjacent end portions of a pair of co-axially aligned pipes for clamping said pipe end portions within the coupling, and with the adjacent ends of the segments being fastened together, and including a means for fastening at least one pair of adjacent segment ends together comprising radially outwardly extending bolt lugs formed upon each of the adjacent segment ends, with the lugs having aligned bolt receiving openings through which a conventional bolt may be inserted for securing the two adjacent lugs together, said fastener comprising:

an elongated pin arranged within the aligned bolt holes in said lugs in place of a normally used fastener bolt, with the pin having a head formed on one of its ends for engaging one of the lugs, and a pivot extension formed on said head, and the opposite end of the pin extended through the opposite lug and extending outwardly a short distance relative to the exterior surface defining the bolt hole of the opposite lug to provide a pin extension portion;

an elongated lever having an end pivotally connected to the head pivot extension;

a stiff wire-like loop attached to the lever near the pivotal connection between the lever and the head pivot extension with said loop normally encircling and engaging both aligned lugs and being of a size to normally fit between and tightly engage against the pin extension portion and the adjacent segment;

the lever being normally positioned adjacent an exterior surface of one of the segments, but being normally swingable about its pivotal connection with the head extension, away from the segment for releasing said loop engagement and to permit the loop to swing around, clear of the free end of the pin extension, for thereby permitting manual movement of the pin endwise out of the aligned bolt holes in the adjacent lugs to thereby unfasten said adjacent segment ends for unclamping pipe end portions with the coupling and to permit inserting pipe ends within the coupling.

2. A releasable fastener as defined in claim 1 and said lever having a hook-like formation formed on its end at a location radially outwardly, relative to the coupling segment of its pivotal connection to the head pivot extension, and said loop having a portion engaged within, but removable from, said hook portion, for interchanging loops of different sizes for utilizing the fastener to secure together different size segment lugs.

3. A releasable fastener as defined in claim 2 and including said loop being longer than the pin and having side parts extending along opposite sides of the pin and the opposite sides of the lugs through which the pin is extended, and being of a length to swing around the pin extension when the lever is swung into an unlocked position and to swing between the pin and the adjacent segment when the lever is swung in an opposite position for locking the fastener in place so that the loop is restrained from removal by the pin extension portion.

4. A combined segment-type pipe coupling and releasable fastener for securing at least one adjacent pair of segment ends together comprising:

said coupling including curved segments which are arranged end to end around a central axis to form a circular coupling for surrounding adjacent end portions of a pair of co-axially aligned pipes for clamping said pipe ends within the coupling;

at least one adjacent pair of segment ends having radially, outwardly extending, integral, aligned bolt fastening lugs having bolt holes through which a conventional bolt may be arranged for securement therein by a conventional nut;

a releasable fastener for use in place of the conventional bolt and nut, including an elongated pin of generally the size of the bolt it replaces, arranged within the aligned bolt holes of said lugs;

a head formed on one end of the pin and engaging one of the lugs through which the pin extends, with the opposite, free end of the pin extending through and outwardly of the opposite lug;

a pivot formed on the head of the pin, with said pivot being pivotally connected to an end of a swingable lever arranged normally adjacent the surface of the segment whose lug is engaged by the pin head;

said lever having an end portion located radially outwardly of the pivot and terminating in a hook-like formation;

a wire-like loop which is generally rectangular in shape, having an end part engaged with the hook formation on the lever, with side parts extending on opposite sides of the aligned lugs and having an opposite end part extending around and engaging the extended portion of the pin and the adjacent part of the segment so that the loop locks the aligned bolt lugs together when the lever is swung into its position adjacent the surface of the segment and the loop is released from such engagement when the lever is swung in an opposite direction away from its segment.

5. A releasable fastener as defined in claim 4, and including said loop being frictionally held upon the hook formation of the lever and being manually releasable therefrom for substitution of a hook of a different size and shape to enable use of the fastener with different size and shape lugs of different segments.

6. A pipe coupling has defined in claim 4, and said loop having side parts of sufficient length to clear and swing around the free end of the pin when the lever is in a release position and to swing behind in an engagement with the pin and the adjacent segment when the lever is swung in the opposite, locking position.

* * * * *